United States Patent [19]

Brandon

[11] Patent Number: 5,520,398
[45] Date of Patent: May 28, 1996

[54] PISTON RING ASSEMBLIES FOR HIGH TEMPERATURE SEALS

[76] Inventor: Ronald E. Brandon, 627 Jubilee St., Melbourne, Fla. 32940

[21] Appl. No.: 186,110

[22] Filed: Jan. 25, 1994

[51] Int. Cl.⁶ .................................................. F16J 15/08
[52] U.S. Cl. ............................ 277/26; 277/174; 277/189; 415/134; 415/136
[58] Field of Search ............................. 277/22, 26, 173, 277/174, 46, 64, 189, 35, 44; 415/134, 135, 136

[56] References Cited

U.S. PATENT DOCUMENTS

| | | | |
|---|---|---|---|
| 796,179 | 8/1905 | Beldam | 277/46 |
| 1,033,237 | 7/1912 | De Ferranti | 277/26 X |
| 1,915,677 | 6/1933 | La Bour | 277/64 |
| 2,223,519 | 12/1940 | Hornschuch | 277/22 |
| 2,678,606 | 5/1954 | Watson | 415/136 X |
| 2,863,632 | 12/1958 | Miller | 415/136 |
| 3,082,011 | 3/1963 | Kroekel | 277/26 |
| 3,588,126 | 6/1971 | McKillop | 277/35 |
| 5,037,115 | 8/1991 | Brandon . | |
| 5,433,453 | 7/1995 | Dalton | 277/215 |

FOREIGN PATENT DOCUMENTS 25790 of 1898 United Kingdom .................... 277/44

*Primary Examiner*—Scott W. Cummings
*Attorney, Agent, or Firm*—Ross, Ross & Flavin

[57] ABSTRACT

In a turbine inclusive of: a turbine shaft having a longitudinal axis, a steam pipe, a shell circumadjacent the pipe, the pipe and shell being shiftable in vertical and transverse and axial directions relative to the longitudinal axis of the shaft, and a seal assembly disposed between the pipe and shell and comprising a stack of interdigitated relatively large and small piston rings, the improvement comprising: placement of the stack of large and small rings into a circular container which is inserted into the shell with adequate clearance to permit thermal expansion, the container being provided with a flexible seal to the shell and having thermal inertia similar to that of the rings and the pipe.

2 Claims, 3 Drawing Sheets

PISTON RING ASSEMBLIES FOR HIGH TEMPERATURE SEALS

BACKGROUND OF THE INVENTION

1. Field of the Invention

In steam turbines it is necessary to provide a sealed passage for steam between two separate casings or shells. Since the casings have different rates and magnitudes of thermal expansion, the seals must be capable of accepting vertical, axial, and transverse differential expansion of the shells, relative to the axis of the turbine shaft, without permitting significant leakage.

2. Description of Related Art

A common method of sealing employs a stack of piston rings that surround a pipe or snout that projects from one shell into a second shell. The stack of piston rings alternate in size, with somewhat smaller rings that fit tightly to the snout being held between larger piston rings that are held in the bore of the second shell such that the outer surface of the rings seal tightly to it. This method permits sliding motion of the pipe through the piston rings while maintaining a seal. It also permits transverse and axial motion of the pipe by sliding the small piston rings relative to the large piston rings, still maintaining a tight seal between the opposing large and small piston ring surfaces while the inner surface of the small piston rings and the outer surface of the large rings continue to seal tightly with the pipe and shell surfaces, respectively.

This method has been in use for a long period of time. It has several disadvantages:

The friction between rings is high and becomes higher as steam pressures are increased. This increases the stress in the rings when sliding motion is required and can cause permanent stretching of the rings that permits leakage.

The rings develop layers of oxide coatings in the hot stream environment that decreases the clearance between rings, eventually leading to a condition that locks the rings in a fixed position precluding motion without stretching the smaller rings, leading to leakage. The oxide layers can become torn and may be of varying thickness, also allowing leakage.

Oxide layers that form between the shell and the large ring outer surface lock these rings in position so that removal for cleaning is not practical without damaging the rings, thereby preventing further service.

Improved rings of U.S. Pat. No. 5,037,115 include a selected coefficient of expansion in combination with materials with low oxide forming ability. These rings have been effective but they normally require field machining of the rings as well as the snout and the bore of the shell.

The machining is expensive, time consuming and must be done with great precision.

In addition, the existing designs are handicapped by the shell surface that opposes the larger rings being a part of a thicker, more massive turbine shell structure, which tends during temperature changes to heat and cool less rapidly than the ring, thus causing either high stress on the ring or a gap between the shell and the ring. In addition, the shell most often has a lower steady state temperature than the ring which can also cause high stress on the large rings.

The invention eliminates previous problems by a combination of all or some of the following improvements.

SUMMARY OF THE INVENTION

In the invention hereof, conventional piston ring systems are improved by the use of a factory-assembled combination of piston rings and a containing outer wall that fits within existing shell bores, has a thermal inertia similar to the snout and is free to expand and contract without a high stress restraint from the shell. In addition, the assembly does not require field machining for installation, except for cutting the final length of the retaining and locking rings. By eliminating the contact surface of piston rings and turbine shell, the problem with thick oxide layers is also eliminated.

The improvements listed above and others will achieve the objective listed above and provide reduced cost and assembly time.

DESCRIPTION OF THE PREFERRED EMBODIMENTS

Figure 1:
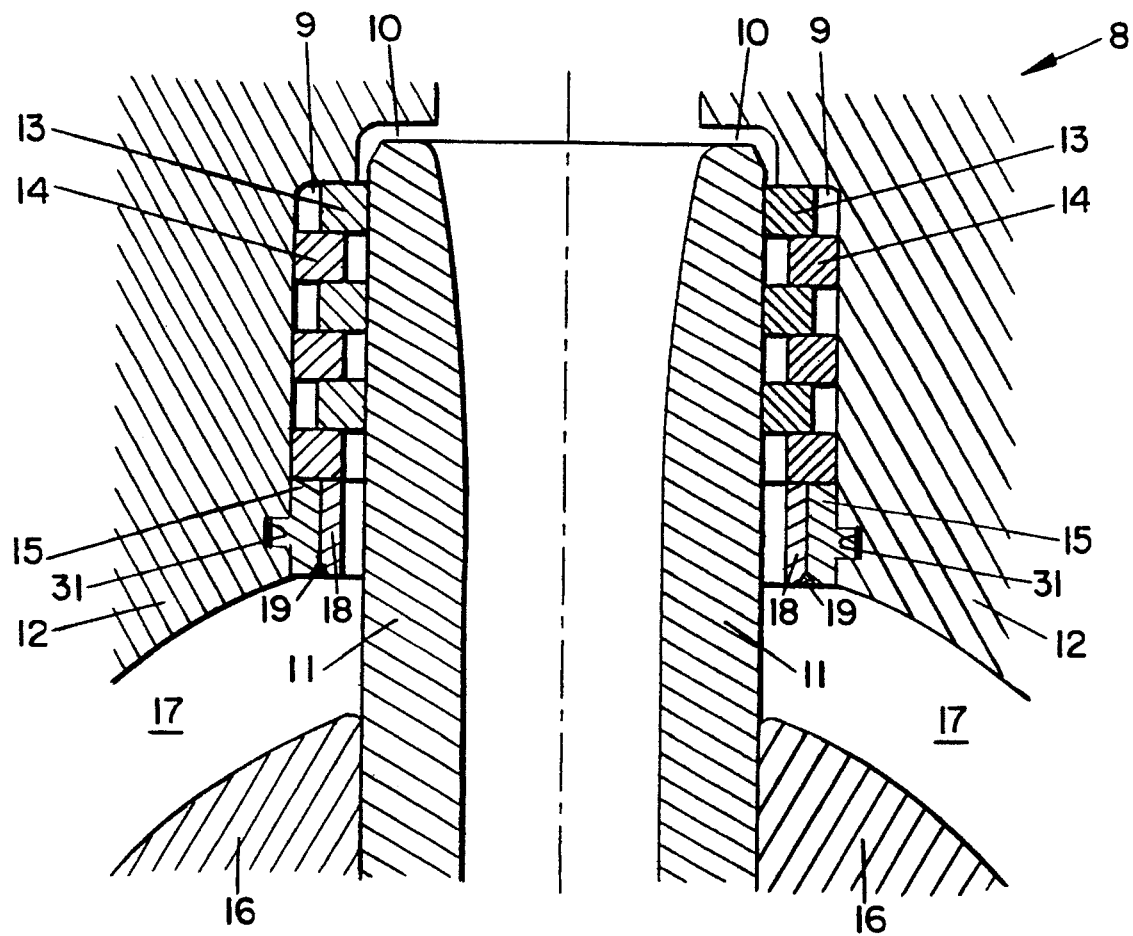
FIG. 1 is a cross-sectional view of a prior art piston ring assembly incorporated in a steam turbine section in the zone where high pressure steam is being passed through an outer shell into an inner shell.

FIG. 1 is a cross-sectional view of a typical prior art piston ring assembly 8 incorporated in the zone of a steam turbine section where high pressure steam is being passed through an outer shell 12 into an inner shell 16. Leakage of steam into a space 17 between the shells will be harmful to efficiency and turbine output. Frequently, there are multiple steam inlets (not shown), in the same plane.

A snout or pipe section 11 projects from inner shell 16 into a cylindrical opening 10 machined into outer shell 12.

In an annular space 9 between pipe section 11 and cylindrical opening 10 in outer shell 12 is mounted piston ring assembly 8 comprising a plurality of small piston rings 13, which fit tightly on the outer periphery of pipe 11, essentially preventing steam leakage at that interface, and a plurality of large piston rings 14 which fit tightly against the wall of opening 9 in outer shell 12, essentially eliminating leakage at that interface.

The small and large piston rings are stacked one on the other in alternating manner and also have common contact surfaces on their upper and lower faces that prevent leakage between the adjacent piston rings.

The steam pressure inside pipe 11 will be higher than the pressure in space 17 between shells 12 and 16, so a positive pressure compresses the rings together.

The rings are prevented from being blown out by four arcuate locking ring segments 15, (only two of which are shown), provided in outer shell 12 and locked in position by a retaining ring 18 which forces the locking ring segments to be engaged with a groove 31 in outer shell 12. Locking ring segments 15 and retainer ring 18 are further secured together as by welds 19.

The steam pressure on the rings compresses the stack together, helping to minimize leakage, but also increasing friction at times when sliding is necessary. This occurs when inner shell 16 changes temperature relative to outer shell 12. Such changes occur during starting, shutdown and operation.

Inner shell 16 can be expected to change the position of pipe 11 relative to outer shell 12 in all three directions: vertically, axially and transversely relative to the axis of a longitudinally-extending stationary turbine shaft, not shown.

To permit such differential motion in the transverse, vertical and axial directions, small piston rings 13 must slide relative to large piston rings 14. This motion must take place without creating such high stress in the small rings as to cause permanent deformation and leakage. Leakage will occur if the rings become stretched and no longer seal against pipe 11.

The general arrangement described above has been in use for several decades with moderate success. The problems encountered include stretching of the small rings with subsequent leakage. The stretching results from high friction that resists the piston ring sliding, which sliding is essential to successful operation. It is costly to evaluate the condition of the rings and to replace them. In addition, the large rings can become permanently reduced in size due to compressive forces caused by a combination of oxide layers and colder inner shell material than ring material.

Figure 2:
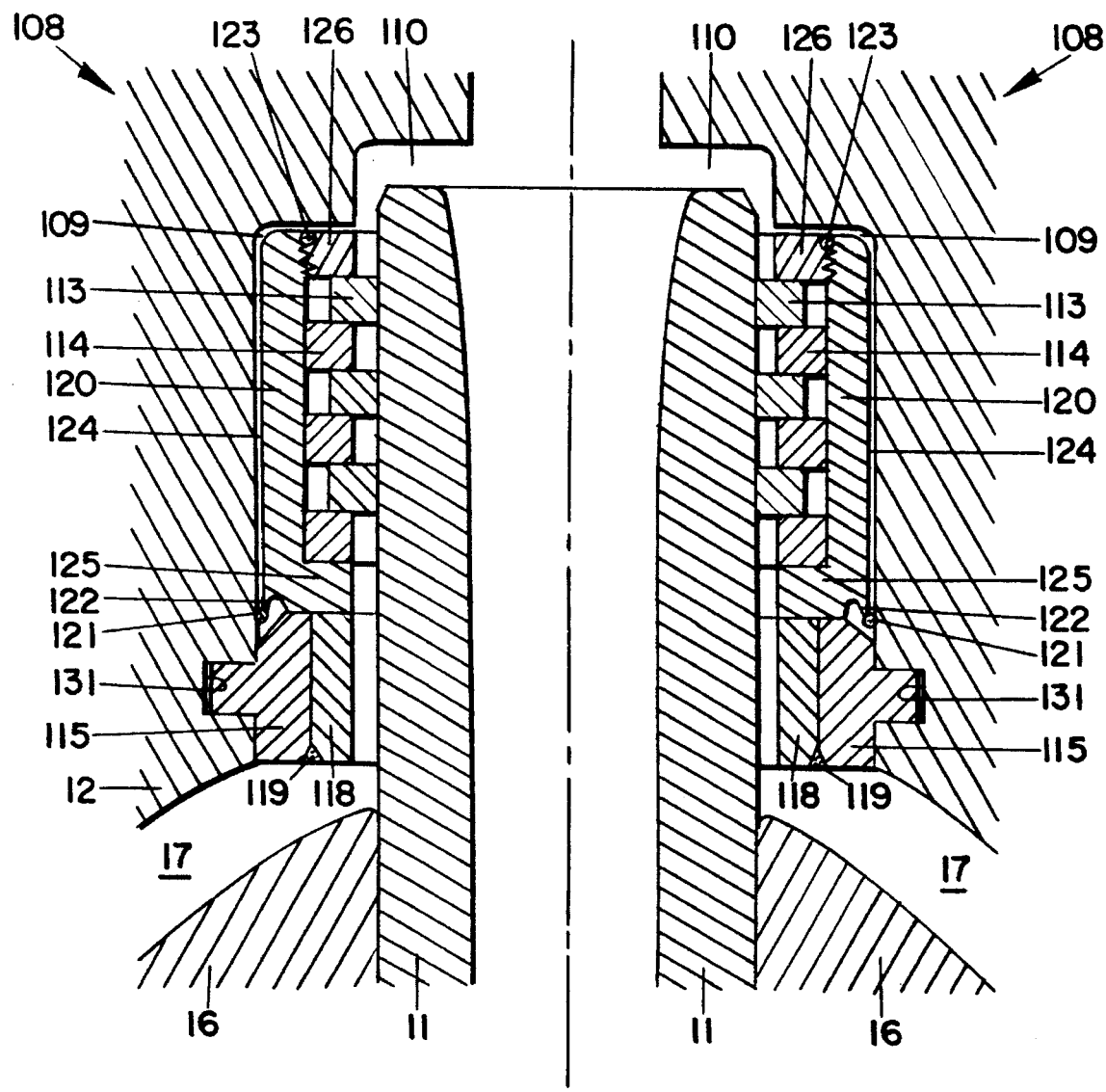
FIG. 2 is a similar cross-sectional view of a piston ring assembly incorporating the improvements of the invention.

FIG. 2 is a cross-sectional view of a piston ring assembly 108 embodying the invention.

As with the prior art piston ring assembly 8 of FIG. 1, a piston ring assembly 108 is incorporated in the zone of a steam turbine section where high pressure steam is being passed through an outer shell 12 into an inner shell 16. Leakage of steam into a space 17 between the shells will be harmful to efficiency and turbine output.

A snout or pipe section 11 projects from inner shell 16 into a cylindrical opening 110 machined into outer shell 12.

In an annular space 109 between pipe section 11 and cylindrical opening 110 in outer shell 12 is mounted piston ring assembly 108 comprising a stack of small piston rings 113 alternating with large piston rings 114 and contained in a cylindrical holder 120.

Cylindrical holder 120 includes at one end a partial lower cover 125 that provides end support for the stack of rings, and has a threaded partial upper end cover 126 at its other end to enclose the rings within the holder. The partial upper cover 126 is threaded onto holder 120 to provide a small, but proper clearance for the stack of rings, then spot welded at 123 to the holder.

Holder 120 is circumferentially welded to shell 12 as at 121. A cut or groove 122 is made in the lower face of lower cover 125 of the holder adjacent weld 121 to permit a low stress flexible fastening that seals against leakage, yet permits holder 120 and the shell to be at different temperatures without creating damaging stress.

Holder 120 should have sufficient radial clearance at 124 to permit thermal expansion of the holder and assembly of the holder despite some distortion of the shell bore 109 and the presence of an oxide layer. A radial clearance of approximately 0.020" is considered proper for most ferritic materials; but it should be recognized that smaller or larger diameter inlets could require lesser or greater clearances.

The end clearance of holder 120 and the shell 12 should also allow adequate space for a hot holder—cold shell condition and some shell surface oxice layer. Again, about 0.020" will usually be adequate.

Holder 120 and rings 113, 114 should be made of high strength, high temperature material with thermal expansion coefficients compatible with pipe 11 and with resistance to the formation of oxide layers.

Four arcuate locking ring segments 115, (only two of which are shown), support holder 120 without causing stress on weld 121 either at assembly or during operation when large pressure forces are pushing against the holder in the direction of flow.

Locking ring segments 115 are secured by a retaining ring 118 which, when properly assembled, forces the locking ring to be engaged with a groove 131 in outer shell 12. A weld 119 between rings 115 and 118 further secures the position of the entire piston ring assembly.

For existing turbines, where application of the new manufactured assembly is to be accomplished, and to fit the new ring assemblies into existing shell bores it will be necessary to make the rings somewhat thinner vertically and narrower in the radial direction. These changes are suggested to provide adequate space for the holder.

It should be noted that by making the rings narrower in the radial direction, the pressure forces compressing the ring stack and causing friction when differential shell movement is required will be reduced. This will also decrease forces contributing to ring stretching.

As noted previously, it is intended that the invention will allow assembly that tolerates out-of-round shell bores and accommodates measured snouts or pipes with the holder and rings being pre-manufactured in a specialized shop. In this way, improved accuracy and roundness can be expected. Subsequent assembly at the power plant can be simplified and accomplished with greater speed. It is further expected that some minor snout out-of-roundness can be tolerated without remachining.

Figure 3:
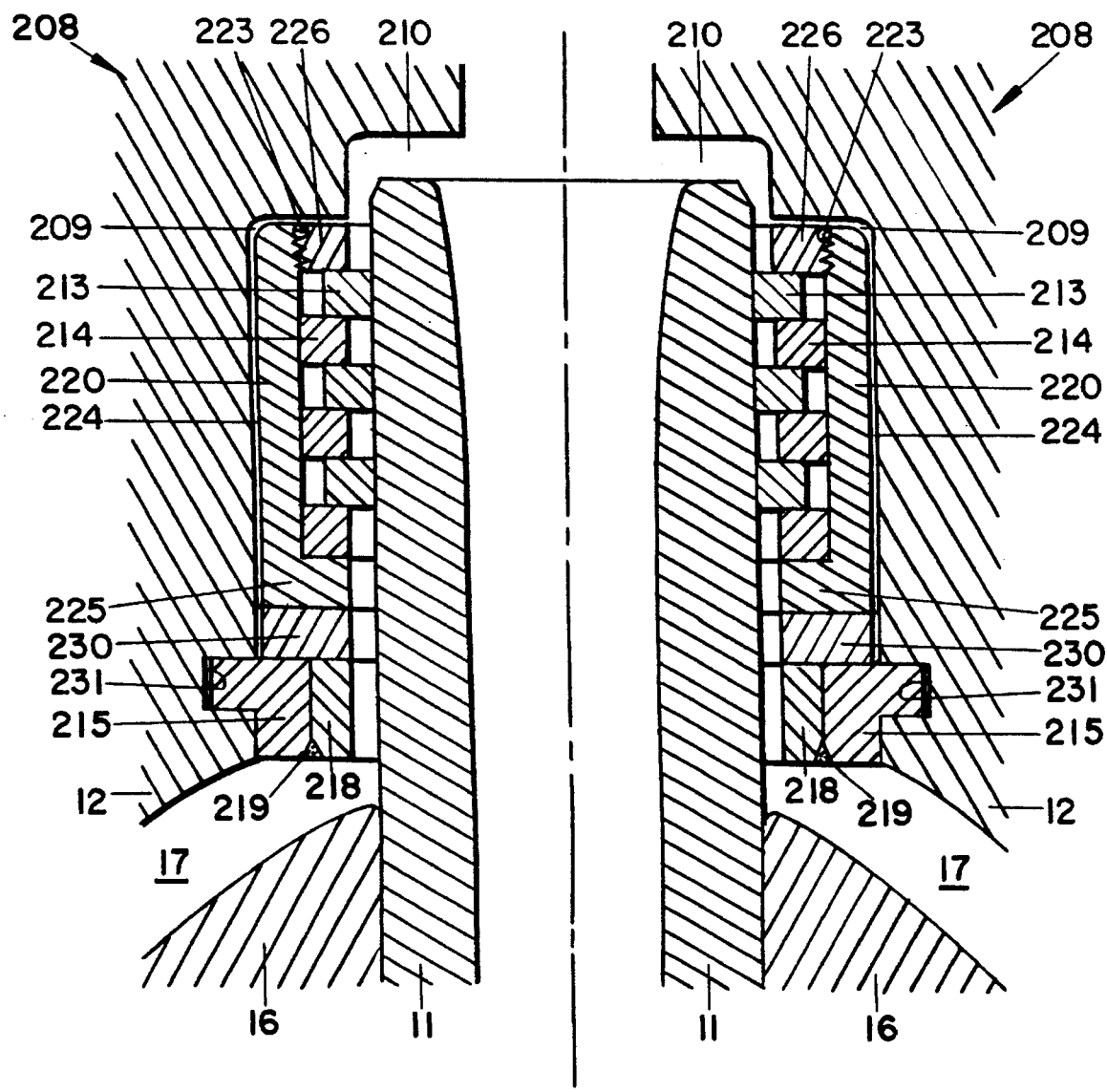
FIG. 3 is a similar cross-sectional view of a piston ring assembly incorporating an alternate form of the invention.

FIG. 3 is a cross-sectional view of a piston ring assembly 208 embodying an alternate form of the invention.

As with the prior art piston ring assembly 8 of FIG. 1, piston ring assembly 208 is incorporated in the zone of a steam turbine section where high pressure steam is being passed through an outer shell 12 into an inner shall 16. Leakage of steam into a space 17 between the shells will be harmful to efficiency and turbine output.

A snout or pipe section 11 projects from inner shell 16 into a cylindrical opening 210 machined into outer shell 12.

In an annular space 209 between pipe section 11 and cylindrical opening 210 in outer shell 12 is mounted piston ring assembly 208, comprising a stack of small piston rings 213 alternating with large piston rings 214 and contained in a cylindrical holder 220.

Cylindrical holder 220 includes at one end a partial lower cover 225 that provides end support for the stack of rings and has a threaded partial upper end cover 226 at the other end to enclose the rings within the holder. Partial upper cover 226 is threaded onto holder 220 to provide a small, but proper clearance for the stack of rings, then spot welded at 223 to the holder.

Holder 220 is positioned by a circular positioning ring 230 disposed below holder lower cover 225, the positioning ring being machined to provide a small radial clearance with the shell 12.

Holder 220 should have sufficient radial clearance as at 224 with shell 12 to permit differential thermal expansion of the holder assembly despite some distortion of the shell bore and the presence of an oxide layer. A radial clearance of approximately 0.020" is considered proper for most ferritic materials; but it should be recognized that smaller or larger diameter inlets could require lesser or greater clearances.

The end clearance of the holder and the shell should also allow adequate space for a hot holder—cold shell condition and some shell surface oxide layer. Again, about 0.020" will usually be adequate.

Four locking ring segments 215, (only two of which are shown), disposed below positioning ring 230, support holder 220 and are comprised of four arcuate segments which must have a minimum leakage space between the separate segments when assembled to form a full circle.

A retaining ring 218 is provided to hold the segments of locking ring 215 secured in a groove 231 in outer shell 12. A weld 219 between rings 215 and 218 further secures the entire assembly.

For existing turbines, where application of the new manufactured assembly is to be accomplished and to fit the new ring assemblies into existing shell bores it will be necessary to make the rings 213 and 214 somewhat thinner vertically and narrower in the radial direction. These changes are suggested to provide adequate space for the holder.

Also, by making the rings narrower in the radial direction, the pressure forces compressing the ring stack and causing friction when differential shell movement is required will be reduced. This will also decrease forces contributing to ring stretching.

As noted previously, it is intended that the invention will allow assembly that tolerates out of round shell bores and accommodates measured snouts or pipes with the holder and rings being pre-manufactured in a specialized shop. In this way, improved accuracy and roundness can be expected. Subsequent assembly at the power plant can be simplified and accomplished with greater speed. It is further expected that some minor snout out-of-roundness can be tolerated without remachining.

Also, the improved snout ring assemblies are intended for use in both inner and outer shell seals.

While it is apparent that the invention herein disclosed is well calculated to achieve the benefits and advantages as hereinabove set forth, it will be appreciated that the invention is susceptible to modification, variation and change without departing from the spirit thereof.

I claim:

1. In a turbine inclusive of:

a stationary, non-rotatable turbine shaft having a longitudinal axis, a steam pipe, a shell circumadjacent the pipe, the pipe and shell being shiftable in vertical, transverse, and axial directions, relative to the longitudinal axis of the shaft, and a seal assembly disposed between the pipe and shell and comprising a stack of interdigitated relatively large and small piston rings, the improvement comprising:

a holder for said stack of piston rings, said holder being of cylindrical shape with partial end walls to contain the stack of piston rings and being spaced from the shell so as to permit differential thermal expansion and to allow the formation of oxide layers on the outer shell while maintaining a small clearance seal with the shell and holding the piston ring stack in proper position to form a small leakage seal with the steam pipe and tolerating differential motion of the shell and pipe.

2. In a turbine according to claim 1, the holder being positioned in the shell by a positioning ring disposed below one of its end walls and being supported in the shell by a locking ring disposed below the positioning ring and engaging the shell.

* * * * *